(12) United States Patent
Marchionda

(10) Patent No.: US 6,628,306 B1
(45) Date of Patent: Sep. 30, 2003

(54) E-MAIL APPLICATIONS OPTION TO CC: SECONDARY RECIPIENTS WITHOUT ATTACHMENTS

(75) Inventor: Dawn M. Marchionda, Marion, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,344

(22) Filed: Nov. 24, 1999

(51) Int. Cl.[7] .............................. G06F 3/00; G06F 13/00
(52) U.S. Cl. ...................... 345/752; 345/751; 345/810; 709/204
(58) Field of Search .................... 345/733, 739, 345/741, 748, 751, 752, 809, 810; 709/201, 204, 205, 207, 232, 238

(56) References Cited

U.S. PATENT DOCUMENTS

| | | | | |
|---|---|---|---|---|
| 5,493,692 A | * | 2/1996 | Theimer et al. | 709/206 X |
| 5,818,447 A | * | 10/1998 | Wolf et al. | 345/752 |
| 5,903,723 A | * | 5/1999 | Beck et al. | 709/201 X |
| 5,913,032 A | * | 6/1999 | Schwartz et al. | 709/201 X |
| 6,057,841 A | * | 5/2000 | Thurlow et al. | 345/809 |
| 6,247,045 B1 | * | 6/2001 | Shaw et al. | 709/207 |
| 6,282,565 B1 | * | 8/2001 | Shaw et al. | 709/207 X |
| 6,343,310 B1 | * | 1/2002 | DiRienzo | 709/201 X |

OTHER PUBLICATIONS

IBM Technical Disclosure Bulletin, "On–Demand Retrieval of Attached File in Mail System", Jan. 1998, IBM, vol. #41, issue # 1, pp. 623–624.*

* cited by examiner

*Primary Examiner*—John Cabeca
*Assistant Examiner*—X. L. Bautista
(74) *Attorney, Agent, or Firm*—Oliff & Berridge, PLC

(57) ABSTRACT

An e-mail option that allows a user to "cc: without attachments" any electronic mail (e-mail) message. Thus, a sender can send an e-mail message to a primary recipient that includes an attachment and, contemporaneously, send a copy of the original e-mail message to a secondary recipient without including the attachment. If there is to be more than one secondary recipient, the user can choose which, if any, of the secondary recipients are to receive the e-mail message with the attachment. In this manner, the sender can alert a secondary recipient, or designated secondary recipients, that a document has been sent, without needlessly including the attachment that is being sent to the primary recipient.

39 Claims, 10 Drawing Sheets

E-MAIL APPLICATIONS OPTION TO CC: SECONDARY RECIPIENTS WITHOUT ATTACHMENTS

BACKGROUND OF THE INVENTION

1. Field of the Invention

The present invention relates to electronic mail applications.

2. Description of Related Art

Currently, it is well known to send and receive electronic messages, or "e-mail", via computer. Additionally, it is also well known that an e-mail message can be sent to a recipient with one or more attachments. Attachments can include, for example, files, folders, pictures, documents, or the like. Attachments are not usually a part of the body of the original e-mail message, but are separately stored and transmitted files that are made up of additional pictures, documents, etc. that are received with the original message. Attachments are most commonly represented, for example, by an icon at the end of the message. To view the contents of an attachment, the attachment must be separately selected and opened. This opens a separate window containing the contents of the file forming the attachment, and may require opening a separate application program.

Generally, when an e-mail message is sent, the sender has the ability to send the message not only to a primary recipient, but also to send the message to any number of secondary recipients. This function is commonly known as a "carbon copy", or "cc", function, so named from the days when carbon paper was used to make duplicate copies of documents.

SUMMARY OF THE INVENTION

Oftentimes, attachments are, or contain, large files. Thus, when a user sends an e-mail message with an attachment, that message can consume a great deal of transmission space on the mail server used to deliver the e-mail message and/or storage space on the recipient's computer. Furthermore, when the user sends the e-mail message to several secondary recipients, and needlessly includes the attachment, the amount of available server space is unnecessarily decreased. This decrease in available server space not only slows the processing of the message that is being sent, but it also slows the processing of any other messages that may simultaneously be crossing the network.

Although it is extremely convenient to send an e-mail message with an attachment to a primary recipient and "cc" that same message to any number of secondary recipients, the secondary recipients do not always need to receive the attachment that is sent to the primary recipient. The secondary recipients may, for example, already have the attachments or may only need to know that an e-mail message was sent to the primary recipient, and thus do not need to receive the attachments sent to the primary recipient.

For instance, a project manager may need to be notified by e-mail that a particular document has been completed and sent to a client. The project manager, as the primary recipient of the e-mail message, may also need to have a copy of the document. Accordingly, the e-mail message to the project manager must include the document as an attachment. However, there may be others working on the same project who only need to know that the particular document has been completed and sent to the client.

Therefore, an e-mail option that allows the user to "cc: without attachments" avoids or reduces sending unnecessarily large e-mail messages. Thus, the user can send an e-mail message to the project manager with the document sent as an attachment. Then, the user can "cc: without attachments" that message to the remaining project teammates. In this manner, the user will inform the project teammates that the required document was sent without needlessly consuming space on the server, unnecessarily slowing the e-mail messages, and/or unnecessarily consuming storage space on the secondary recipients' computers.

Additionally, not all secondary recipients are able to receive or handle attachments, especially if the attachments are large files. For example, a user may know that a particular secondary recipient accesses that user's e-mail over a wireless connection. In that instance, the user may wish to send an e-mail message to that particular secondary recipient without including any attachments. Thus, the user avoids needlessly impairing that secondary recipient's ability to wirelessly interact while an unnecessary attachment downloads. Furthermore, some e-mail service providers, such as, for example, Juno™, do not allow for the transmission of attachments with e-mail messages. Thus, a user can avoid sending files as attachments when the attachments will not be received by a particular secondary recipient.

Accordingly, this invention provides systems, methods, and graphical user interfaces that allow e-mail users who want to alert persons other than a primary recipient that an e-mail message or a given piece of information has been sent to the recipient, but who do not want or need to include attachments intended only for the primary recipient.

This invention separately provides a user with an e-mail option that allows the user to "cc: without attachments" an e-mail message.

This invention separately provides apparatuses and methods to decrease the amount of space that a given "cc" e-mail message consumes on an e-mail server.

This invention separately provides apparatuses and methods to increase the speed and efficiency of e-mail service.

This invention separately provides apparatuses and methods for an e-mail option that allows the user to "cc: without attachments" an e-mail message having a substantially simple and user-friendly design.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF THE PREFERRED EMBODIMENT

Figure 1:
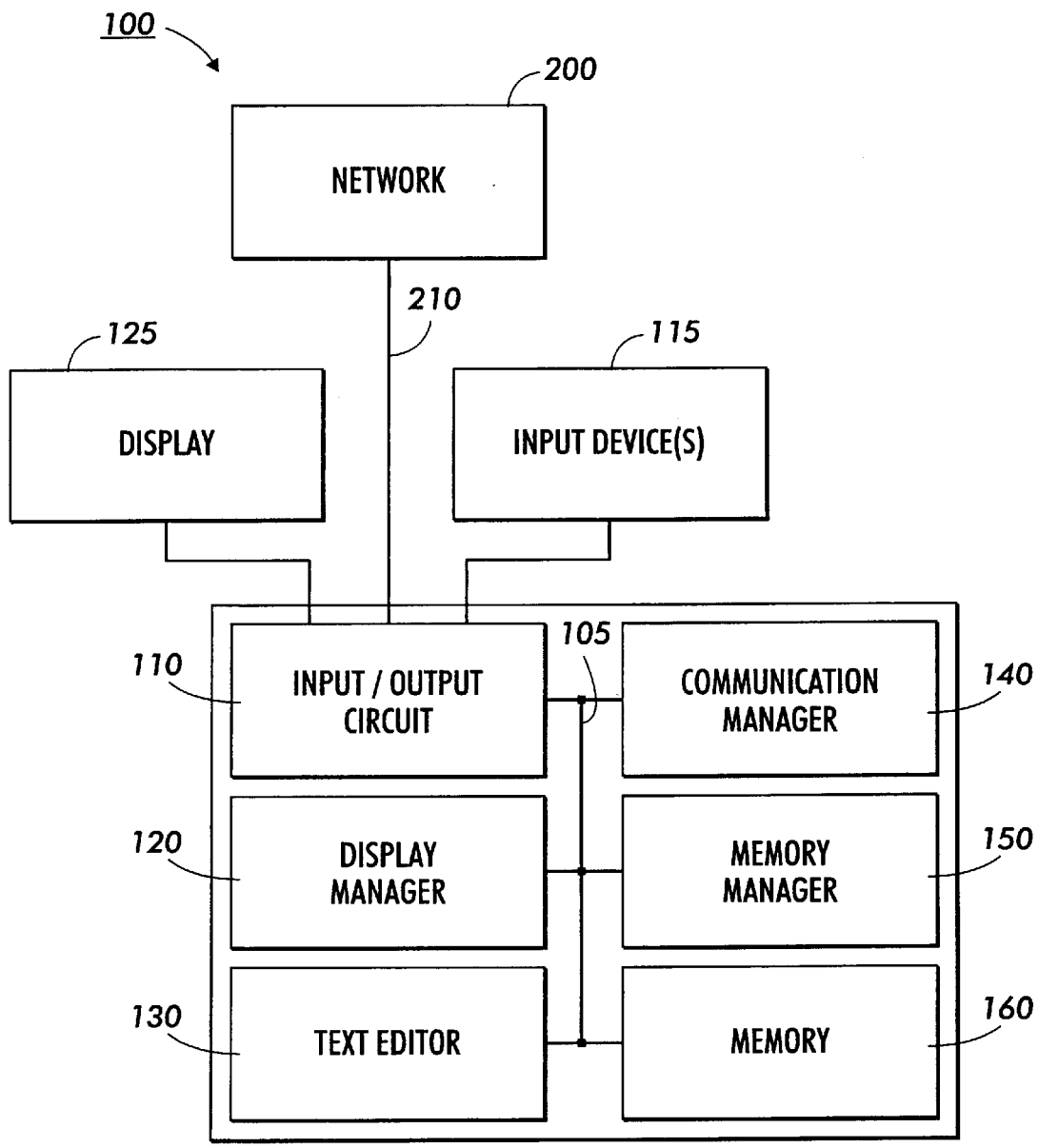
FIG. 1 is a functional block diagram outlining a first exemplary embodiment of an e-mail system according to this invention.
Figure 2A:
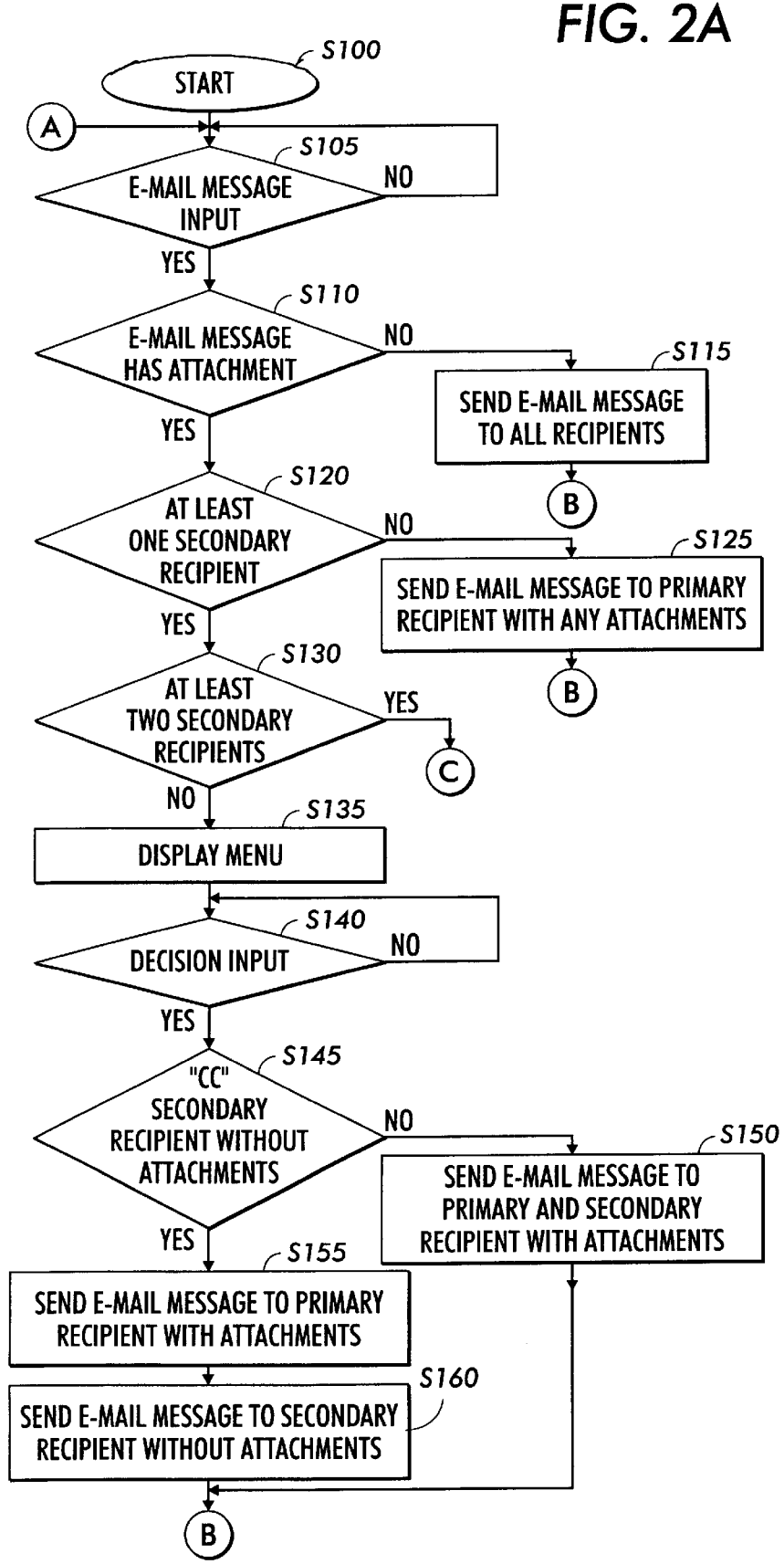
FIGS. 2A and 2B are a flowchart outlining one exemplary embodiment of a method for using the e-mail system according to this invention.
Figure 2B:
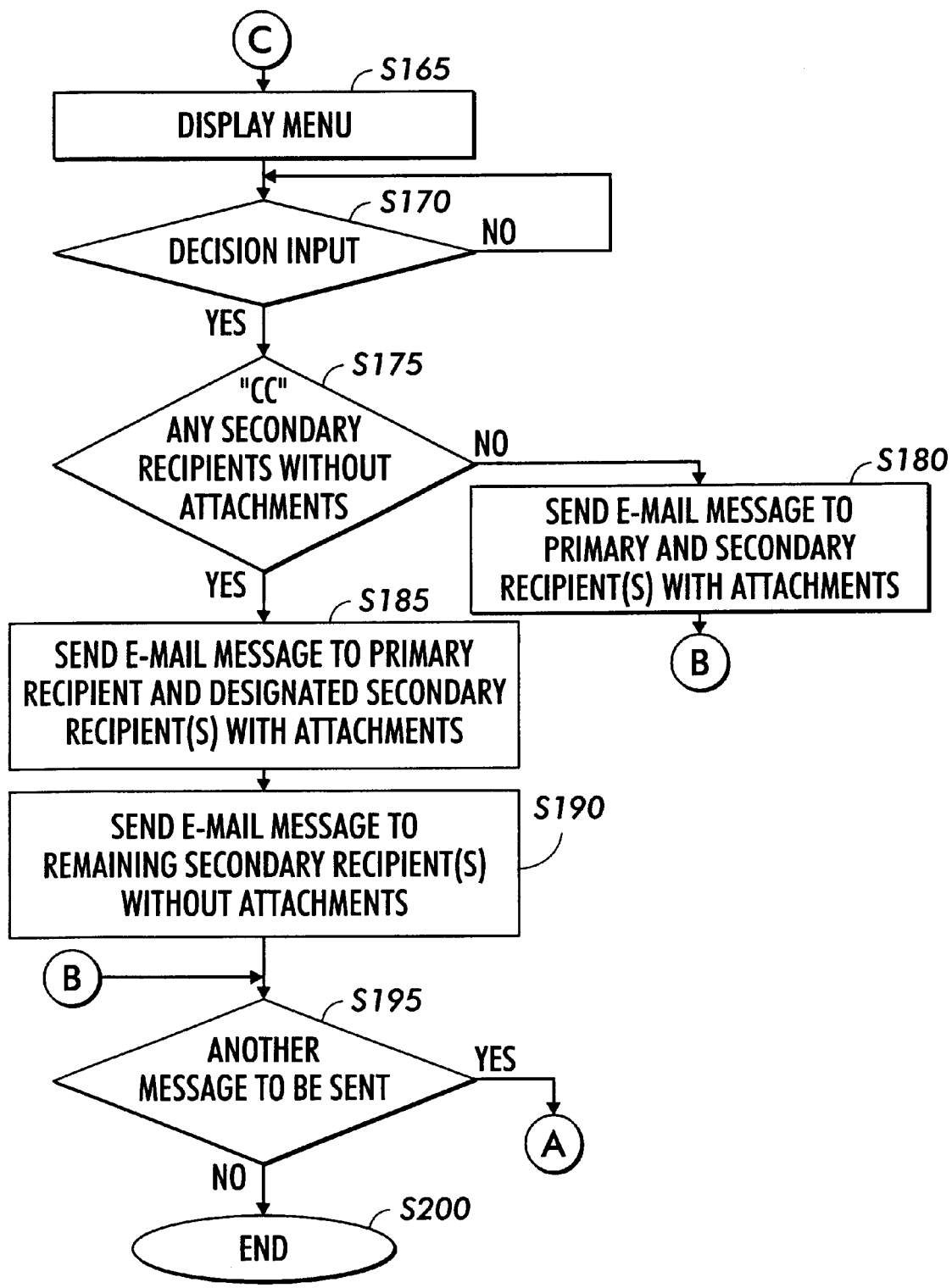

For simplicity and clarification, the operating principles, design factors, and layout of the e-mail systems, methods, and graphical user interfaces according to this invention are explained with reference to an exemplary embodiment of an e-mail system 100, shown in FIG. 1, and an exemplary embodiment of a method for sending a message to one or more secondary recipients without attachments, as shown in FIGS. 2A and 2B. The basic explanation of the operation of the e-mail systems, methods, and graphical user interfaces is applicable for the understanding and design of the constituent components employed in the e-mail systems, methods, and graphical user interfaces of this invention.

Furthermore, for the sake of simplicity, the term attachment will be used. It should be understood that the term attachment is not limited to a single attachment, but can also include more than one attachment. Additionally, in the various exemplary embodiments described herein, for example, the e-mail system is described with respect to a user sending a new e-mail message with an attachment. Alternatively, the e-mail systems, methods and graphical user interfaces of this invention also operate when a user forwards an e-mail message having an attachment.

FIG. 1 is a functional block diagram outlining a first exemplary embodiment of the e-mail system 100 having a "cc: without attachments" function, according to this invention. As shown in FIG. 1, an e-mail system 100 includes at least some of an input/output circuit 110, a display manager 120, a text editor 130, a communication manager 140, a memory manager 150, and a memory 160, connected together by a data/control bus 105. In various exemplary embodiments, the e-mail system 100 will be included as part of the software executing on a computer or on a personal digital assistant (PDA). It should be appreciated that any other known or later developed system capable of processing and outputting data could be used in place of the computer or PDA.

As shown in FIG. 1, the memory 160 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The input/output circuit 110 is connected to one or more of a display 125, one or more input devices 115, and, over a link 210, to a network 200. In various exemplary embodiments, the display 125 can be a cathode ray tube display, a liquid crystal display or any other known or later developed system capable of displaying data. The one or more input devices 115 can be one or more of a keyboard, a mouse, a touch screen, a touch pad, a microphone or any other known or later developed device capable of inputting data. The input/output circuit 110 receives data from each of the one or more input devices 115, over the link 210, from the network 200, and transmits the received data to the data/control bus 105. The input/output circuit 110 also receives data from the data/control bus 105 and transmits that data to at least one of the display 125, the one or more input devices 115, and over the link 210 to the network 200.

The link 210 can be any known or later developed device or system for connecting the e-mail system 100 to the network 200, including a direct wired connection, a connection over the public switched telephone network, a connection over a coaxial cable (i.e., CATV) system, a connection over a cellular telephone network, a satelite connection or the like. In general, the link 210 can be any known or later developed connection system or structure usable to connect the e-mail system 100 to the network 200, including both wired and wireless connections.

The display manager 120 drives the display 125. The text editor 130 allows the user to compose and edit e-mail messages. The memory 160 stores e-mail messages composed using the text editor 130. The memory manager 150 manages reading data from and writing data to the memory 160. The memory 160 stores software and data used by the e-mail system 100. For example, the memory 160 stores word processing software and communication software. The communication manager 140 drives the transmission of data to and the reception of data from the network 200 through the link 210.

In operation, one exemplary embodiment of the e-mail system 100, the e-mail system 100 is in a normal mode in which the user can utilize all the e-mail functions that the e-mail system 100 is able to perform. However, if an e-mail message is input from either the memory 160 or the text editor 130, and a primary recipient has been designated to receive the e-mail message with an attachment, the e-mail system 100 determines whether at least one secondary recipient has also been designated to receive the e-mail message.

If at least one secondary recipient has also been designated to receive the e-mail message, the e-mail system 100 drives the display 125 to display a menu to invite the user to select between at least the functions of sending the e-mail message to the secondary recipient with the attachment or sending the e-mail message to the secondary recipient without the attachment. If there are at least two secondary recipients, the e-mail system 100 drives the display 125 to display a menu that also includes an option to send the e-mail message to at least one of the secondary recipients with the attachment and to send the e-mail message to at least one other secondary recipient without the attachment.

If the user chooses to send the e-mail message to the secondary recipient with the attachment, the e-mail system 100 sends the e-mail message to both the indicated primary recipient and the at least one secondary recipient with the attachment.

If the user chooses to send the e-mail message to the at least one secondary recipient without the attachment, the e-mail system 100 sends the e-mail message to the indicated primary recipient with the attachment and sends the e-mail message to the at least one secondary recipient without the attachment.

If the user chooses to send the e-mail message to at least one of the secondary recipients with the attachment and to send the e-mail message to at least one other secondary recipient without the attachment, the e-mail system 100 sends the e-mail message to the indicated primary recipient with the attachment, sends the e-mail message to the at least one designated secondary recipient with the attachment, and sends the e-mail message to the at least one designated secondary recipient without the attachment, in accordance with the user's input.

FIGS. 2A and 2B are a flowchart outlining one exemplary embodiment of a method for using an e-mail system having the "cc: without attachments" option according to this invention. A user can send an e-mail message to a primary recipient with an attachment. The user can also choose to send the same e-mail message to at least one secondary recipient either with or without the attachment. If there are at least two secondary recipients, the user can send the e-mail message to at least one of the secondary recipients with the attachment and send the e-mail message to at least one other secondary recipient without the attachment.

As shown in FIG. 2A, control begins in step S100, upon a user selecting a "send new message" function or otherwise accessing an e-mail message manager, and continues to step S105, where a determination is made whether an e-mail message has been input. If, in step S105, a determination is made that an e-mail message has not been input, control returns to S105. Otherwise, control advances to step S110.

In step S110, a determination is made whether the input e-mail message includes an attachment. If in step S100, a determination is made that the input e-mail message does not include an attachment, control advances to step S115. Otherwise, control advances to step S120.

In step S115, the e-mail message is sent to all recipients. Control then jumps to step S195.

In step S120, a determination is made whether the e-mail message, including the attachment, is to be sent to both a primary recipient and to at least one secondary recipient. If, in step S120, a determination is made that the e-mail message including the attachment is to be sent only to a primary recipient, control advances to step S125. Otherwise, control advances to step S130.

In step S125, the e-mail message is sent to the designated primary recipient with any attachments. Control then jumps to step S195.

In contrast, in step S130, a determination is made whether the e-mail message including the attachment is to be sent to at least two secondary recipients. If, in step S130, a determination is made that the e-mail message including the attachment is to be sent to only one secondary recipient, control advances to step S135. Otherwise, control jumps to step S165.

In step S135, a graphical user interface is displayed that invites the user to choose either to "cc" the e-mail message to the secondary recipient with the attachment or to "cc" the e-mail message to the secondary recipient without the attachment. Then, in step S140, a determination is made whether a decision was input. If, in step S140, no decision was input, control returns to step S140. If, however, a decision was input in step S140, control advances to step S145.

In step S145, a determination is made whether the user has chosen to "cc" the e-mail message to the secondary recipient without the attachment. If, in step S145, the user chose to "cc" the e-mail message to the secondary recipient with the attachment, control advances to step S150. Otherwise, control jumps to step S155.

In step S150, control sends the e-mail message is sent to both the primary recipient and the secondary recipient with the attachment. Control then jumps to step S195.

In contrast, in step S155, the e-mail message is sent to the primary recipient with the attachment. Next, in step S160, the e-mail message is sent to the secondary recipient without the attachment. Control then jumps to step S195.

In step S165, a graphical user interface is displayed that invites the user to choose which, if any, of the at least two secondary recipients is to receive the e-mail message with the attachment. Then, in step S170, a determination is made whether a decision was input. If, in step S170, no decision was input, control returns to step S170. If, however, a decision was input in step S170, control advances to step S175.

In step S175, a determination is made whether the user chose to "cc" any of the secondary recipient without the attachment. If, in step S175, the user chose to "cc" the e-mail message to each of the at least two secondary recipient without the attachment, control advances to step S180. Otherwise, control advances to step S185.

In step S180, the e-mail message is sent to the primary recipient and all of the secondary recipients with the attachment. Control then jumps to step S195.

In contrast, in step S185, the e-mail message is sent to the primary recipient and any designated secondary recipient(s) with the attachment. Next, in step S190, the e-mail message is sent to the remaining secondary recipient(s) without the attachment. Then, in step S195, a determination is made whether another e-mail message has been input. If, in step S195, a determination was made that another e-mail message has been input, control jumps back to step S105. Otherwise, control advances to step S200, where the e-mail message function is closed.

In other exemplary embodiments of the methods for using the e-mail system according to this invention, the graphical user interface displays described in FIGS. 2A–B can be replaced with, for example, one or more icons or one or more drop-down menus. By selecting the icon(s) or the appropriate command(s) in the drop-down menu(s), the user can choose to send the e-mail message to at least one secondary recipient either with or without the attachment, as described above. If there are at least two secondary recipients, the icon(s) or drop-down menu(s) allow the user to send the e-mail message to at least one of the secondary recipients with the attachment and send the e-mail message to at least one other secondary recipient without the attachment, as further described below with respect to FIGS. 3–8.

Figure 3:
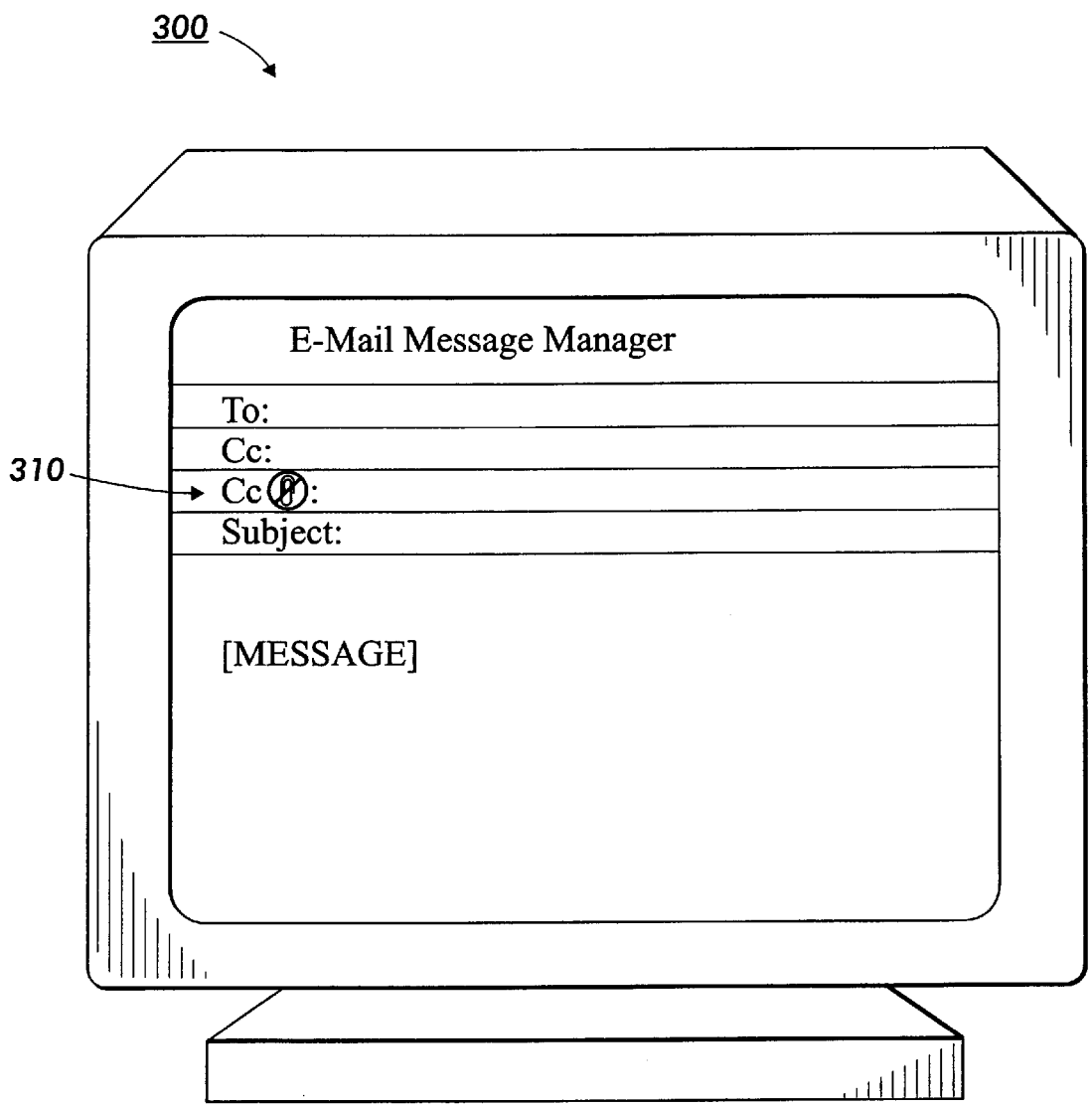
FIG. 3 is a schematic representation of a first exemplary embodiment of an e-mail graphical user interface for selecting recipients to receive an e-mail message without an attachment according to this invention.

FIG. 3 is a schematic representation of a first exemplary embodiment of a graphical user interface for selecting recipients to receive an e-mail message without an attachment according to this invention. As shown in FIG. 3, the graphical user interface 300 includes a "cc: without attachments" field 310. Any recipients identified in the "cc: without attachments" field 310 will receive the e-mail message without an attachment. In various exemplary embodiments, the "cc: without attachments" field 310 contains a phrase, such as, for example "cc: without attachments". In various other exemplary embodiments, the "cc:

without attachments" field 310 contains an icon, such as, for example the standard icon for an attachment, a paper clip, with a not symbol over it. In various other exemplary embodiments, the "cc: without attachments" field 310 contains a combination of a phrase and an icon, such as, for example "cc:" phrase with the icon as discussed above.

Figure 4:
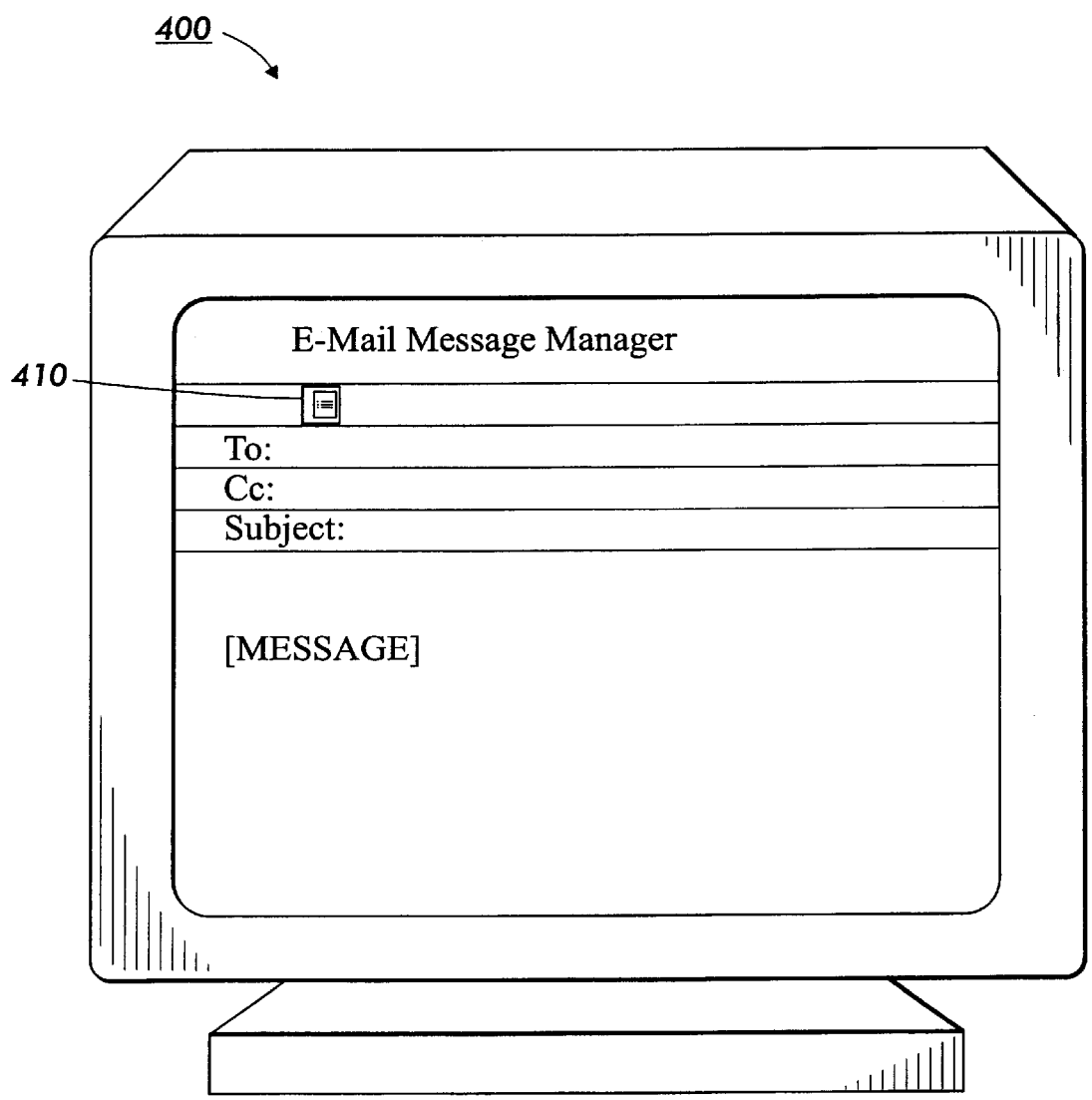
FIG. 4 is a schematic representation of a second exemplary embodiment of an e-mail graphical user interface for selecting recipients to receive an e-mail message without an attachment according to this invention.

FIG. 4 is a schematic representation of a second exemplary embodiment of a graphical user interface for selecting recipients to receive an e-mail message without an attachment according to this invention. As shown in FIG. 4, the graphical user interface 400 includes an icon 410. In particular, the icon 410 allows the user to select a function to "cc: without attachments" a secondary recipient. If the user selects the "cc: without attachments" icon 410, a menu, for example, as shown in one of FIGS. 6–9 will subsequently appear.

Figure 5:
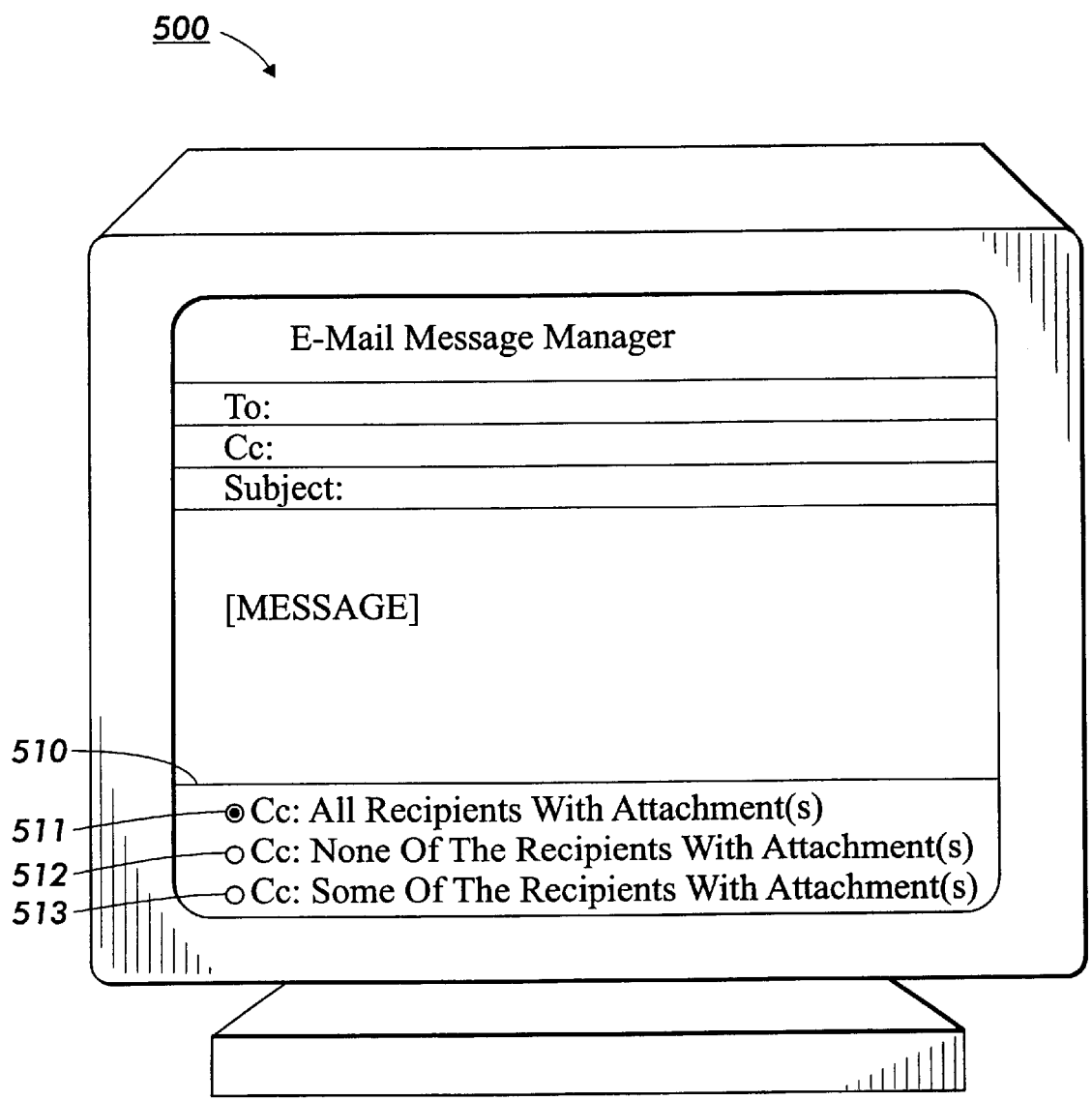
FIG. 5 is a schematic representation of a third exemplary embodiment of an e-mail graphical user interface for selecting recipients to receive an e-mail message without an attachment according to this invention.

FIG. 5 is a schematic representation of a third exemplary embodiment of a graphical user interface for selecting recipients to receive an e-mail message without an attachment according to this invention. As shown in FIG. 5, the graphical user interface 500 includes a plurality of radio buttons 510. In particular, the plurality of radio buttons 510 include a radio button 511 that allows the user to select only one of a "cc: all of the recipients with attachments" function, a radio button 512 that allows the user to select a "cc: none of the recipients with attachments" function, or a radio button 513 that allows the user to select a "cc: some of the recipients with attachments" function. The graphical user interface 500 can be implemented, for example, in step S135 or step S165 as described above with respect to FIGS. 2A–2B. If the user selects the "cc: some of the recipients with attachments" function, a menu, for example, as shown in one of FIGS. 9—9 will subsequently appear.

Figure 6:
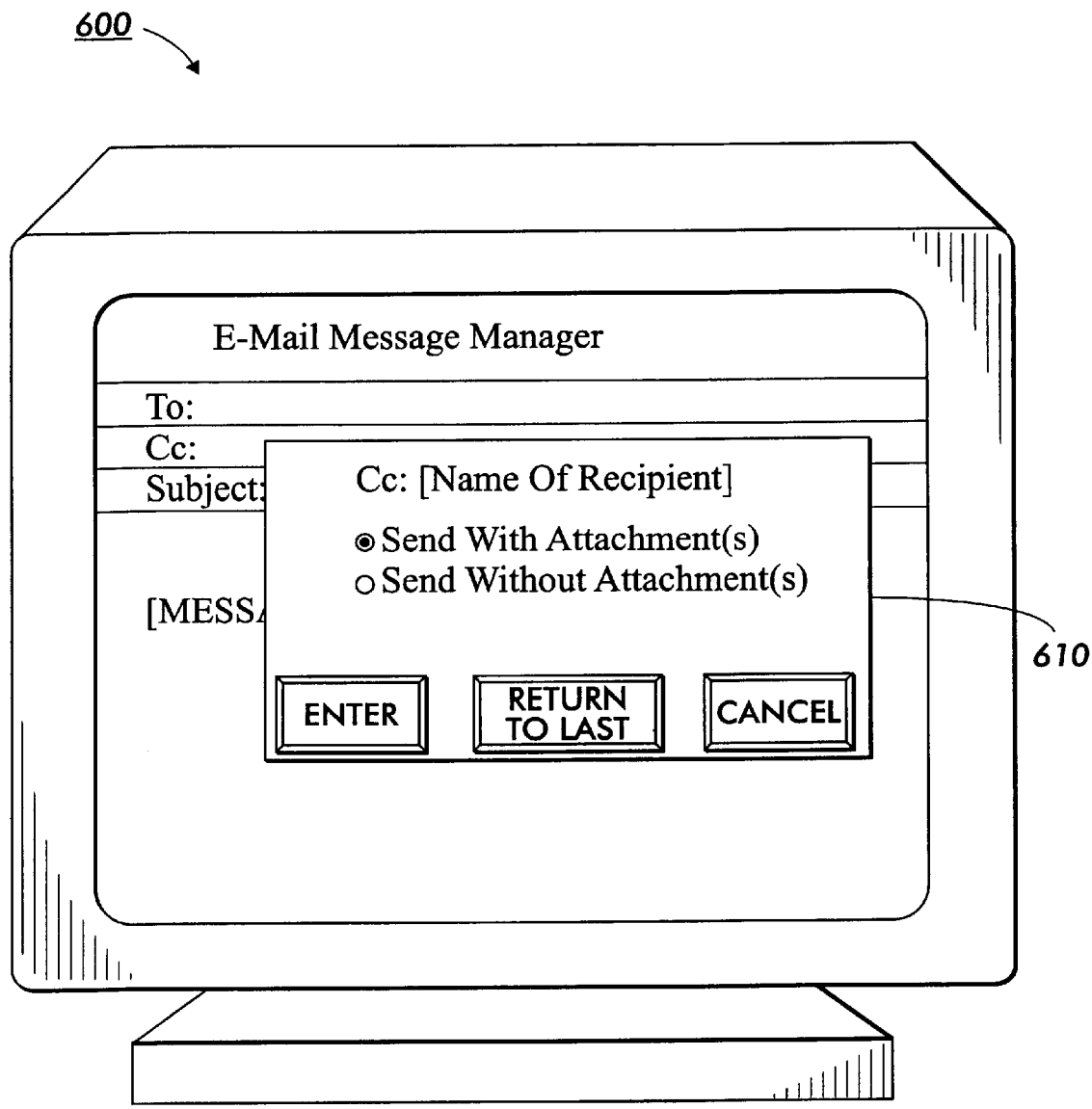
FIG. 6 is a schematic representation of a fourth exemplary embodiment of an e-mail graphical user interface for selecting recipients to receive an e-mail message without an attachment according to this invention.

FIG. 6 is a schematic representation of a fourth exemplary embodiment of a graphical user interface for selecting the recipients to receive an e-mail message without an attachment according to this invention. As shown in FIG. 6, the graphical user interface 600 includes a menu 610. The menu 610 can be implemented, for example, in step S135 or step S165 as described above with respect to FIGS. 2A–2B. In particular, the graphical user interface 600 can be displayed in response to the user selecting the icon 310 or the radio button 413. The menu 610 includes a set of radio buttons that allow the user to input whether to "cc:" an e-mail message with or without attachments. The menu 610 initially appears with the name of the first secondary recipient designated. The user may choose to send the message to the named secondary recipient with or without the attachment.

Once the user has input a decision for the first secondary recipient, the menu 610 reappears with the name of a second secondary recipient, if a second secondary recipient was designated. Again, as described above, the user may choose to send the message to the second named secondary recipient with or without the attachment. The menu 610 will reappear sequentially, as described above, until the user has input a decision for each of the designated secondary recipients. Each time the menu 610 is displayed, the menu 610 allows the user to enter his or her decision, return to the last selection, or cancel the selection process.

Figure 7:
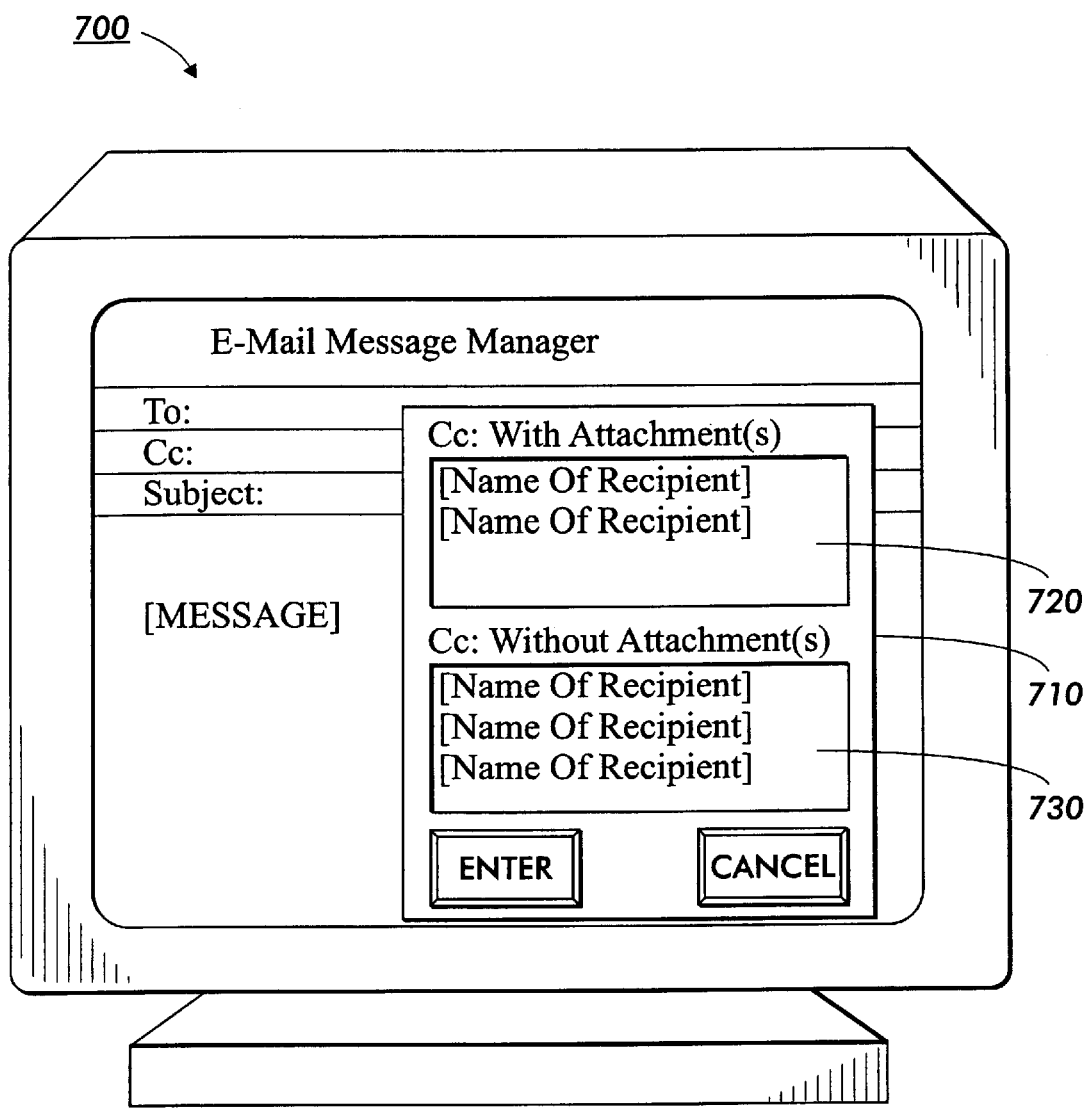
FIG. 7 is a schematic representation of a fifth exemplary embodiment of an e-mail graphical user interface for selecting recipients to receive an e-mail message without an attachment according to this invention.

FIG. 7 is a schematic representation of a fifth exemplary embodiment of a graphical user interface for selecting recipients to receive an e-mail message without an attachment according to this invention. As shown in FIG. 7, the graphical user interface 700 includes a menu 710. The menu 710 can be implemented, for example, in step S135 or step S165 as described above with respect to FIGS. 2A–2B. In particular, the graphical user interface 700 can be displayed in response to the user selecting the icon 310 or the radio button 413. The menu 710 includes a set of entry boxes 720 and 730. The entry box 720 allows the user to input the name(s) of any of the "cc:" recipients to receive the e-mail message with the attachment. In contrast, the entry box 730 allows the user to input the name(s) of any of the "cc:" recipients to receive the e-mail message without the attachment. Once the user has input the names of the various "cc:" recipients, the user may enter the decision. Additionally, the menu 710 allows the user to cancel the selection process at any time by way of a cancel function.

Figure 8:
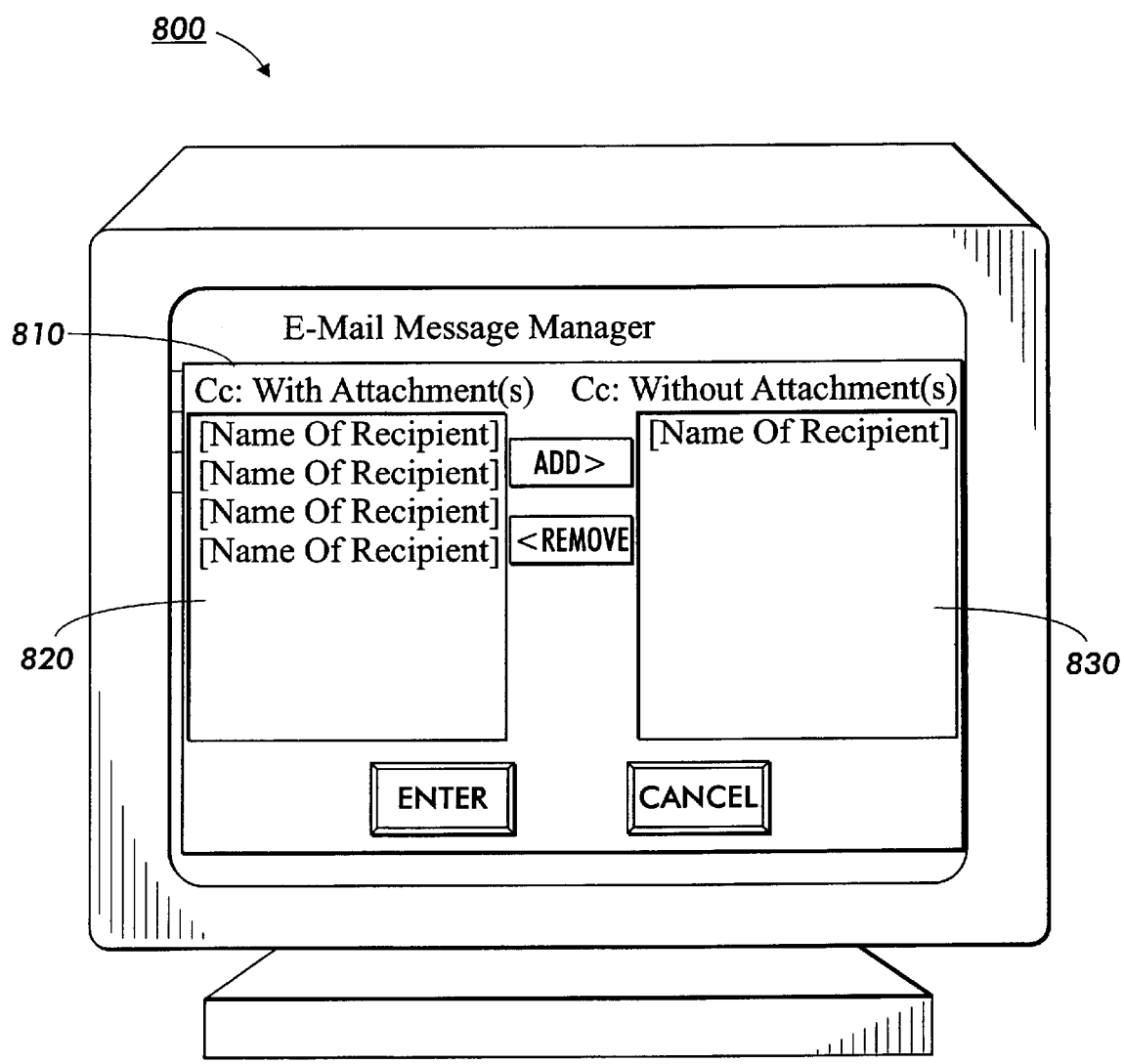
FIG. 8 is a schematic representation of a sixth exemplary embodiment of an e-mail graphical user interface for selecting recipients to receive an e-mail message without an attachment according to this invention.

FIG. 8 is a schematic representation of a sixth exemplary embodiment of a graphical user interface for selecting recipients to receive an e-mail message without an attachment according to this invention. As shown in FIG. 8, the graphical user interface 800 includes a menu 810. The menu 810 can be implemented, for example, in step S135 or step S165 as described above with respect to FIGS. 2A–2B. In particular, the graphical user interface 800 can be displayed in response to the user selecting the icon 310 or the radio button 413. The menu 810 includes a display box 820 and a display box 830. The display box 820 includes the name of each "cc:" recipient of the e-mail message, designating each such recipient as receiving the e-mail message with the attachment. In contrast, the display box 830 includes the name of those "cc:" recipients of the e-mail message designated to receive the e-mail message without the attachment. Initially, the display box 820 includes the name of every "cc:" recipient of the e-mail message with the attachment and the display box 830 is empty.

The user selects any of the named recipients listed in the display box 820 and, by choosing the add function, transfers the selected recipient's name from the display box 820 to the display box 830. Once the user has determined the appropriate one of the display boxes 820 and 830 for each recipient, the user may enter the decision. Additionally, the menu 810 allows the user to cancel the selection process at any time by way of a cancel function.

Figure 9:
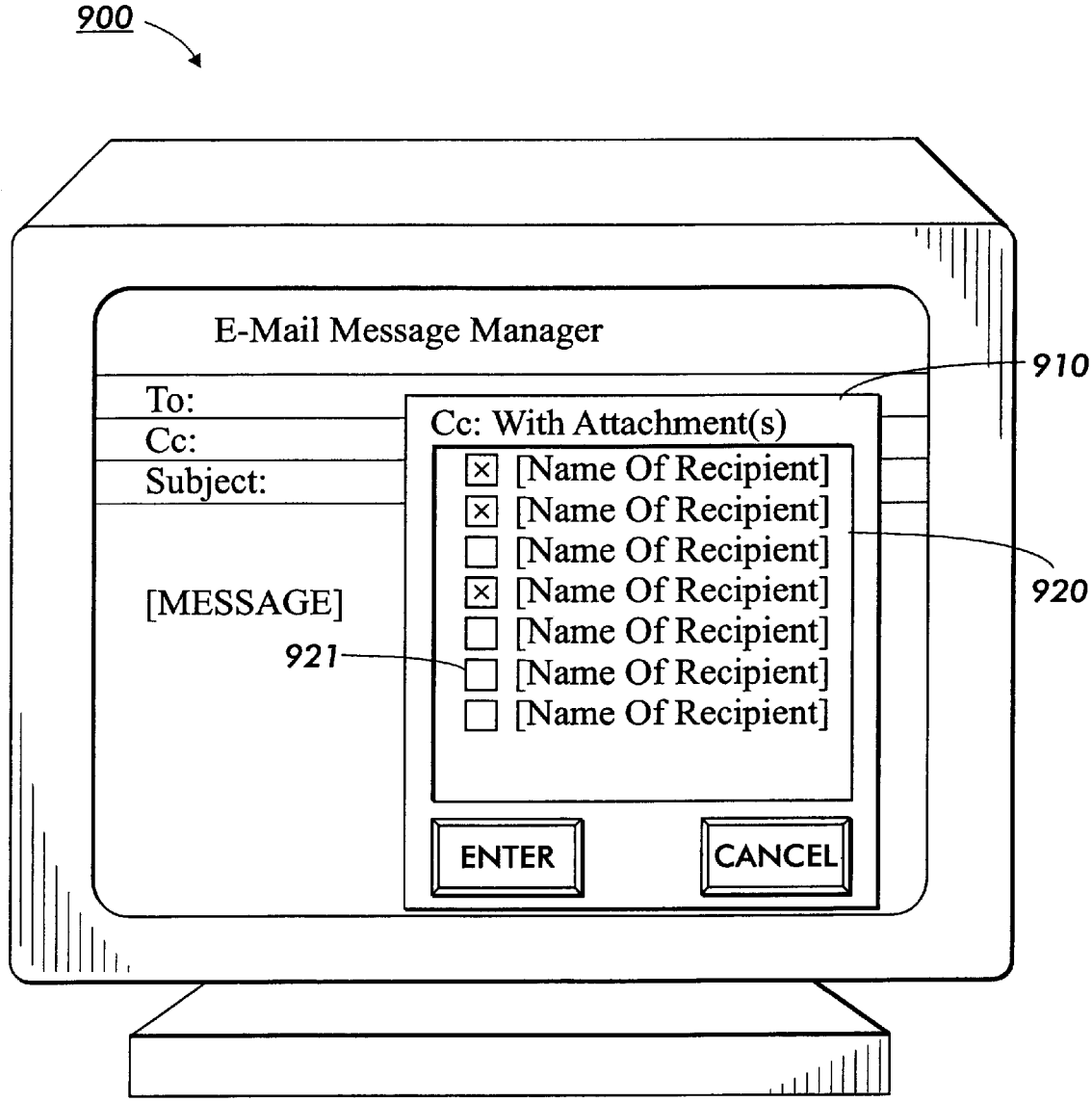
FIG. 9 is a schematic representation of a seventh exemplary embodiment of an e-mail graphical user interface for selecting recipients to receive an e-mail message without an attachment according to this invention.

FIG. 9 is a schematic representation of a seventh exemplary embodiment of a graphical user interface for selecting recipients to receive an e-mail message without an attachment according to this invention. As shown in FIG. 9, the graphical user interface 900 includes a menu 910. The menu 910 can be implemented, for example, in step S135 or step S165 as described above with respect to FIGS. 2A–2B. In particular, the graphical user interface 900 can be displayed in response to the user selecting the icon 310 or the radio button 413. The menu 910 includes a display box 920. The display box 920 includes the name of each recipient of the e-mail message. The display box 920 further includes check boxes 921. Each check box 921 corresponds to and represents one named recipient of the e-mail message. Initially, each check box 921 is not checked.

In one exemplary embodiment, by checking a check box 921, the user selects the corresponding named recipient to receive the e-mail message with the attachment. Alternatively, in a second exemplary embodiment, by checking a check box 921, the user selects the correspondingly named recipients to receive the e-mail message without the attachment. Once the user has determined that each recipient's corresponding check box 921 has been appropriately marked, the user may enter the decision. Additionally, the menu 910 allows the user to cancel the selection process at any time by way of a cancel function.

It should be appreciated that the embodiments described above involve selecting secondary recipients to receive an e-mail message with or without an attachment. It is understood that if there are at least two attachments included with the original e-mail message, the systems, methods and graphical user interfaces of this invention will operate similarly to the exemplary embodiments described above to determine which of the at least two attachments is/are to be sent to each respective secondary recipient.

It should also be appreciated that the terms "primary recipient" and "secondary recipient" are for basic explanation and understanding of the operation of the e-mail system. Therefore, the terms "primary recipient" and "secondary recipient" are not to be construed as limiting a user's ability to send an e-mail message to a "primary recipient" without an attachment, while sending the e-mail to at least one "secondary recipient" with an attachment.

It should be understood that each of the elements of the e-mail system 100 shown in FIG. 1 can be implemented as portions of a suitably programmed general purpose computer. Alternatively, each of the elements of the e-mail system 100 shown in FIG. 1 can be implemented as physically distinct hardware circuits within an ASIC, or using a FPGA, a PDL, a PLA or a PAL, or using discrete logic elements or discrete circuit elements. The particular form each of the elements of the e-mail system 100 shown in FIG. 1 will take is a design choice and will be obvious and predicable to those skilled in the art.

Moreover, the e-mail system 100 can be implemented as software executing on a programmed general purpose computer, a special purpose computer, a microprocessor or the like. In this case, the e-mail system 100 can be implemented as a routine embedded in a network client, as a resource residing on a network server, or the like. The e-mail system 100 can also be implemented by physically incorporating it into a software and/or hardware system, such as the hardware or firmware systems of a personal digital assistant, a bi-directional pager, an analog or digital cellular phone or the like.

Thus, in summary, the e-mail system 100 can be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIGS. 2A and 2B and/or the graphical user interfaces shown in FIGS. 3–8, can be used to implement the e-mail system 100.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of sending e-mail to at least one secondary recipient without including attachments, comprising:

identifying at least one e-mail at least one attachment;

determining whether there is at least one secondary recipient of the e-mail message including the at least one attachment that has been identified;

providing an option to determine whether the at least one secondary recipient is to receive the at least one e-mail message with the at least one attachment; and sending the at least one e-mail message to the primary recipient and the at least one secondary recipient, wherein the at least one e-mail is sent to the primary recipient including the at least one attachment and to the at least one secondary recipient including or excluding the at least one attachment based on the determination whether the at least one secondary recipient is to receive the at least one e-mail message with the at least one attachment.

2. The method of claim 1, further including determining whether there are at least two secondary recipients of the e-mail message including the at least one attachment.

3. The method of claim 2, further including determining whether any of the at least two secondary recipients are to receive the at least one e-mail message including the at least one attachment.

4. The method of claim 3, further including determining which of the at least two secondary recipients are to receive the at least one e-mail message including the at least one attachment.

5. The method of claim 4, further including sending the at least one e-mail message including the at least one attachment to be sent to the primary recipient and the at least two secondary recipients based on the determinations which, if any, of the at least two secondary recipients are to receive the at least one e-mail message including the at least one attachment.

6. The method of claim 1, wherein the at least one attachment is at least one of a file, a folder, a picture, or a document.

7. The method of claim 1, wherein determining whether there is at least one secondary recipient includes:

reviewing the list of recipients; and determining whether there are at least two identified recipients.

8. The method of claim 1, wherein sending the at least one e-mail message includes sending the at least one e-mail message using at least one of either a wired connection or a wireless connection to a network.

9. An apparatus for sending e-mail to at least one secondary recipient without including attachments, comprising:

a processing circuit that determines whether there is at least one secondary recipient of an e-mail message including at least one attachment that is addressed to a primary recipient;

a display manager that displays at least one option that allows a user to input whether the at least one secondary recipient is to receive the at least one e-mail message with the at least one attachment;

a processing circuit that determines whether the at least one secondary recipient is to receive the at least one e-mail message with the at least one attachment based on the user input; and a communication manager that sends the at least one e-mail message sent to the primary recipient and the at least one secondary recipient to, wherein the at least one e-mail is sent to the primary recipient including the at least one attachment and to the at least one secondary recipient including or excluding the at least one attachment based on the determination whether the at least one secondary recipient is to receive the at least one e-mail message with the at least one attachment.

10. A graphic user interface, comprising:

a function for composing an e-mail message with at least one attachment;

a function for sending the e-mail message to a primary recipient including at least one attachment;

a function for determining whether to send at least one attachment to a secondary recipient with the e-mail message; and a function for sending the e-mail message to the primary recipient and the at least one secondary recipient, wherein the e-mail is sent to the primary recipient including the at least one attachment and to the secondary recipient including or excluding the at least one attachment based on the determination whether the at least one secondary recipient is to receive the at least one e-mail message with the at least one attachment.

11. The graphic user interface of claim 10, wherein the determining function includes a function for allowing a user to generate an input whether to send the e-mail message with or without the at least one attachment.

12. A control system that sends an electronic mail message with an attachment to a primary recipient and at least one secondary recipient, the control system comprising:

a processing circuit that makes a determination whether there is to be at least one secondary recipient of the e-mail message that includes at least one attachment;

a display manager that displays an option that allows a user to input whether the at least one secondary recipient is to receive the at least one e-mail message with the at least one attachment;

a processing circuit that makes a determination whether the at least one secondary recipient is to receive the at least one e-mail message with the at least one attachment; and a communication manager that sends the at least one e-mail message including at least one attachment to be sent to the primary recipient and the at least one secondary recipient in accordance with the aforementioned determinations;

wherein the display manager displays a graphical user interface displayable on the computing device, the graphical user interface comprising:

a primary recipient portion that identifies a primary recipient to receive an electronic message with at least one attachment;

a secondary recipient portion that identifies at last one secondary recipient to receive a copy of the electronic message with the at least one attachment; and at least one selection portion that permits a user to identify which of the at least one secondary recipients is to be sent the electronic message without the attachment.

13. The control system of claim 12, wherein the at least one selection portion comprises at least one selectable icon to access at least one treatment option screen.

14. The control system of claim 13, wherein the treatment option screen has at least one option to send a copy of the electronic message with at least one attachment to at least one secondary recipient.

15. The control system of claim 14, wherein the treatment option screen is displayed for each of the at least one secondary recipient.

16. The control system of claim 15, wherein each treatment option screen is sequentially displayed for each of the at least one secondary recipient.

17. The control system of claim 16, wherein each treatment option screen includes a selectable icon to return to a previous treatment option screen.

18. The control system of claim 13, wherein the treatment option screen has at least one portion that identifies each recipient to receive the electronic message with the at least one attachment and at least one portion that identifies each recipient to receive the electronic message without the at least one attachment.

19. The control system of claim 13, wherein the treatment option screen has at least one first portion identifying each secondary recipient to receive the electronic message with the at least one attachment, at least one second portion for identifying each secondary recipient to receive the electronic message without the at least one attachment, and at least one control for moving the identification of each secondary recipient between the first and second portions.

20. The control system of claim 13, wherein the treatment option screen lists each recipient to receive the electronic message.

21. The control system of claim 20, wherein the list includes at least one markable box, each markable box associated with one identified secondary recipient.

22. The control system of claim 21, wherein each marked box indicates that the associated secondary recipient is to receive the electronic message without the at least one attachment, and each unmarked box indicates that the associated secondary recipient is to receive the electronic message with the at least one attachment.

23. The control system of claim 21, wherein each marked box indicates that the associated secondary recipient is to receive the electronic message with the at least one attachment, and each unmarked box indicates that the associated secondary recipient is to receive the electronic message without the at least one attachment.

24. The control system of claim 13, wherein the treatment option screen includes a selectable icon to accept the treatment identified on the treatment option screen.

25. The control system of claim 13, wherein the treatment option screen includes a selectable icon to exit the treatment option screen.

26. The control system of claim 12, wherein the graphical user interface comprises at least one portion having at least one option to send a copy of the electronic message with the at least one attachment to each recipient, at least one option to send a copy of the electronic message without the at least one attachment to each recipient, and at least one option to send a copy of the electronic message with the at least one attachment to at least one designated recipient.

27. The control system of claim 26, wherein the at least one option to send a copy of the electronic message with the at least one attachment to at least one designated recipient accesses at least one treatment option screen.

28. The control system of claim 27, wherein the treatment option screen has at least one option to send a copy of the electronic message with at least one attachment to at least one secondary recipient.

29. The control system of claim 28, wherein the treatment option screen is displayed for each of the at least one secondary recipient.

30. The control system of claim 29, wherein each treatment option screen is sequentially displayed for each of the at least one secondary recipient.

31. The control system of claim 30, wherein each treatment option screen includes a selectable icon to return to a previous treatment option screen.

32. The control system of claim 27, wherein the treatment option screen has at least one portion that identifies each recipient to receive the electronic message with the at least one attachment and at least one portion that identifies each recipient to receive the electronic message without the at least one attachment.

33. The control system of claim 27, wherein the treatment option screen has at least one first portion identifying each secondary recipient to receive the electronic message with the at least one attachment, at least one second portion for identifying each secondary recipient to receive the electronic message without the at least one attachment, and at least one control for moving the identification of each secondary recipient between the first and second portions.

34. The control system of claim 27, wherein the treatment option screen lists each recipient to receive the electronic message.

35. The control system of claim 34, wherein the list includes at least one markable box, each markable box associated with one identified secondary recipient.

36. The control system of claim 35, wherein each marked box indicates that the associated secondary recipient is to receive the electronic message without the at least one attachment, and each unmarked box indicates that the associated secondary recipient is to receive the electronic message with the at least one attachment.

37. The control system of claim 35, wherein each marked box indicates that the associated secondary recipient is to receive the electronic message with the at least one attachment, and each unmarked box indicates that the associated secondary recipient is to receive the electronic message without the at least one attachment.

38. The control system of claim 27, wherein the treatment option screen includes a selectable icon to accept the treatment identified on the treatment option screen.

39. The control system of claim 27, wherein the treatment option screen includes a selectable icon to exit the treatment option screen.

* * * * *